(12) United States Patent
Arthanat et al.

(10) Patent No.: US 11,537,909 B2
(45) Date of Patent: Dec. 27, 2022

(54) MONITORING DATABASE PROCESSES TO GENERATE MACHINE LEARNING PREDICTIONS

(71) Applicant: Oracle International Corporation, Redwood Shores, CA (US)

(72) Inventors: Sudhir Arthanat, Bangalore (IN); Prashant Prakash, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 459 days.

(21) Appl. No.: 16/729,840

(22) Filed: Dec. 30, 2019

(65) Prior Publication Data

US 2021/0201173 A1    Jul. 1, 2021

(51) Int. Cl.
*G06N 5/04*      (2006.01)
*G06F 16/242*    (2019.01)
*G06F 11/30*     (2006.01)
*G06F 11/34*     (2006.01)
*G06N 20/00*     (2019.01)

(52) U.S. Cl.
CPC ........... *G06N 5/04* (2013.01); *G06F 11/3034* (2013.01); *G06F 11/3447* (2013.01); *G06F 16/2433* (2019.01); *G06N 20/00* (2019.01)

(58) Field of Classification Search
CPC ............ G06F 11/3447; G06F 11/3034; G06F 16/2433; G06N 20/00; G06N 5/04
See application file for complete search history.

(56) References Cited

U.S. PATENT DOCUMENTS

| | | | |
|---|---|---|---|
| 6,965,886 B2 | 11/2005 | Govrin et al. | |
| 8,341,178 B2 | 12/2012 | Belknap et al. | |
| 8,577,871 B2* | 11/2013 | Dageville | G06F 16/217 |
| | | | 707/719 |
| 8,775,413 B2 | 7/2014 | Brown et al. | |
| 9,053,137 B2* | 6/2015 | Medicke | G06F 16/22 |
| 9,389,982 B2 | 7/2016 | Werner et al. | |
| 2003/0225736 A1 | 12/2003 | Bakalash et al. | |
| 2007/0033160 A1* | 2/2007 | Santosuosso | G06F 16/24539 |

(Continued)

FOREIGN PATENT DOCUMENTS

CN    104820663 A    8/2015

OTHER PUBLICATIONS

Mustafa et al., "A Machine Learning Approach for Predicting Execution Time of Spark Jobs" (Year: 2018).*

(Continued)

*Primary Examiner* — Phillip H Nguyen
(74) *Attorney, Agent, or Firm* — Potomac Law Group, PLLC

(57) ABSTRACT

Methods and system are presented for monitoring database processes to generate machine learning predictions. A plurality of database processes executed on database implementations can be monitored, wherein the monitoring includes determining a start time, an end time, and a number of rows impacted by portions of the database processes, and the monitored database processes generate instances of machine learning data including at least the number of rows impacted and an associated duration of time. Using a machine learning component and the machine learning data, a duration of time can be predicted for a candidate database process for execution on a database implementation.

20 Claims, 10 Drawing Sheets

(56) References Cited

U.S. PATENT DOCUMENTS

| | | | | |
|---|---|---|---|---|
| 2014/0214880 | A1* | 7/2014 | Chi | G06F 16/2453 |
| | | | | 707/768 |
| 2016/0203404 | A1* | 7/2016 | Cherkasova | G06N 5/04 |
| | | | | 706/12 |
| 2018/0157978 | A1* | 6/2018 | Buda | G06N 20/00 |
| 2020/0104397 | A1* | 4/2020 | Fan | G06F 16/24545 |

OTHER PUBLICATIONS

Pham et al., "Predicting Workflow Task Execution Time in the Cloud Using a Two-Stage Machine Learning Approach" (Year: 2017).*

Wu et al., "Towards Predicting Query Execution Time for Concurrent and Dynamic Database Workloads" (Year: 2013).*

Vamshi Pasunura, "Predicting Query Execution Time using Statistical Techniques" (Year: 2016).*

Smith et al., "Predicting application run times with historical information" (Year: 2004).*

Singhal et al., "Predicting SQL Query Execution Time for Large Data Volume" (Year: 2016).*

Raza et al., "Performance prediction and adaptation for database management system workload using Case-Based Reasoning approach" (Year: 2018).*

Ahmad et al., "Predicting Completion Times of Batch Query Worklads Using Interaction-aware Models and Simulation", EDBT 2011, Mar. 22-24, 2011, Uppsala, Sweden, Copyright 2011 ACM 978-1-4503-0528-0/11/0003.

Anonymous, "SQL Server Profiler", Microsoft Documents, https://docs.microsoft.com/en-us/sql/tools/sql-server-profiler/sql-server-profiler?view=sql-server-2017, downloaded Jul. 25, 2019.

Anonymous, "Using Profilers", https://help-2017r2.acumatica.com/(W(2))/Wiki/ShowWiki aspx? ?pageid=e4c450bb-86bc-4fb2-b7e6-1f715abe3c8b , downloaded Jul. 25, 2019.

Pinal; "SQL Server—Tips for SQL Query Optimization by Analyzing Query Plan", https://blog.sqlauthority.com/2013/08/28/sql-server-tips-for-sql-query-optimization-by-analyzing-query-plan/, downloaded Jul. 25, 2019.

Unknown, "Request Profiler", https://help-2017r2.acumatica.com/(W(23))/Wiki/ShowWiki.aspx?pageid-e7612f3f-fc6f-494d-8532-cc2ceef7147b ; downloaded Jul. 25, 2019.

* cited by examiner

```
INSERT INTO %table(PP_AE_LOG_TBL) (PROCESS_INSTANCE
, AE_APPLID
, AE_SECTION
, AE_STEP
, DESCR
, NUMROWS
, STARTDATETIME
, ENDDATETIME)
VALUES (%ProcessInstance
, %AEProgram
, %AESection
, %AEStep
, ''
, 0
, %CurrentDateTimeIn
, NULL)
```
— 502

```
UPDATE %table(PP_AE_LOG_TBL)
SET NUMROWS = %sqlRows, ENDDATETIME = %CurrentDateTimeIn
WHERE PROCESS_INSTANCE = %ProcessInstance
AND AE_APPLID = %AEProgram
AND AE_SECTION = %AESection
AND AE_STEP = %AEStep
```
— 504

Fig. 5

MONITORING DATABASE PROCESSES TO GENERATE MACHINE LEARNING PREDICTIONS

FIELD

The embodiments of the present disclosure generally relate to monitoring database processes to generate machine learning predictions.

BACKGROUND

The proliferation of computing and connected devices has generated vast amounts of data that requires management. As data grows in size the technological challenges related to efficiently managing the data, such as writing, querying, and generally storing structured data, become increasingly complex. For example, given the cost of computational resources, efficient data management is highly valued. In addition, organizations have become more reliant on data analytics, and thus timely and reliable data processing is also in high demand. Accordingly, efficient and predictable data processing can greatly benefit organizations that rely on data analytics.

SUMMARY

The embodiments of the present disclosure are generally directed to systems and methods for monitoring database processes to generate machine learning predictions. A plurality of database processes executed on database implementations can be monitored, wherein the monitoring includes determining a start time, an end time, and a number of rows impacted by portions of the database processes, and the monitored database processes generate instances of machine learning data including at least the number of rows impacted and an associated duration of time. Using a machine learning component and the machine learning data, a duration of time can be predicted for a candidate database process for execution on a database implementation.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 5 illustrates sample structured query language statements for monitoring database processes according to an example embodiment.

DETAILED DESCRIPTION

Figure 1:
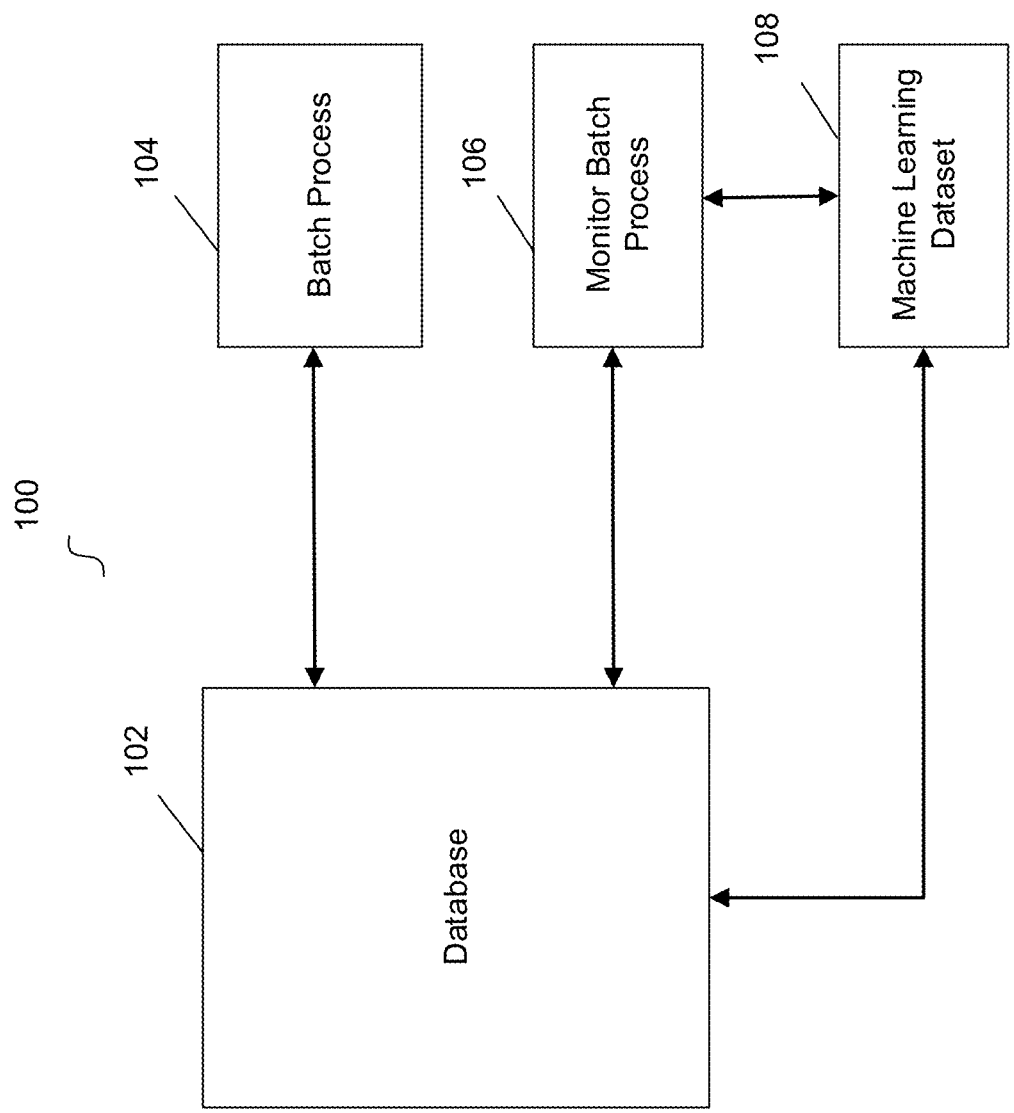
FIG. 1 illustrates a system for monitoring database processes to generate machine learning predictions according to an example embodiment.

Embodiments monitor database processes to generate machine learning predictions. For example, database processes can include batch processes or programs that perform operations on a database, such as writes, reads, and/or queries. In some embodiments, database processes can include a number of Structured Query Language ("SQL") statements executed on a database. Embodiments monitor database processes to generate machine learning data that enables machine learning predictions for candidate database processes.

In some embodiments, a database process can include database sub-processes, which can include database steps, which can include a number of SQL statements. Embodiments can monitor database execution at the process level, sub-process level, step level, and/or SQL statement level. For example, for a given SQL statement executed as part of a database process (e.g., batch process or program), a start time, end time, number of rows impacted in the database, and duration of execution time can be logged for the given SQL statement. Embodiments can monitor at the SQL statement level, and thus individual SQL statements within a larger database process can be monitored without monitoring the database process as a whole. In other words, the monitoring can be targeted, and therefore can use resource more efficiently and minimize any disruptions to business (or other) functions.

In some embodiments, based on the monitoring, execution times and a number of rows impacted can be logged for an element of a database process (e.g., at the process level, sub-process level, step level, or SQL statement level). These logged values can be used to generate machine learning data. For example, training data for a supervised machine learning component can be generated, where the number of rows impacted can be a feature of the training data (in addition to other features) and the monitored duration of execution time can be the labels for the training data. In some embodiments, a supervised machine learning component can then be trained with the training data and used to generate a duration of execution time prediction for a candidate database process. In some embodiments, the generated machine learning data can be used by an unsupervised machine learning component. For example, an unsupervised machine learning component can match a candidate database process to one or more instances of the generated machine learning data, which can in turn generate a duration of execution time prediction for a candidate database process.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for monitoring database processes to generate machine learning predictions according to an embodiment. System 100 includes database 102, batch process 104, monitored batch process 106, and machine learning dataset 108. Database 102 can be any suitable database that can be queried by a query language (e.g., structured query language ("SQL")), such as a relational database or any other suitable database. Batch process 104 can be any suitable batch process that includes one or more database commands (e.g., read, write, query, and the like). For example, batch process 104 can connect to database 102 such that these database commands can be executed. Monitor batch process 106 can be software (e.g., script or executable code) to monitor batch process 104. For example, monitor batch process 106 can connect to database 102 such that the executed commands from batch process 104 can be monitored. In some embodiments, monitor batch process 106 can log data about the execution of one or more commands of database process 104. Based on the monitoring, the data generated by monitor batch process 106 can be used to create machine learning dataset 108, which can include data about the database commands from database process 104 that are monitored by monitor batch process 106.

Figure 2:
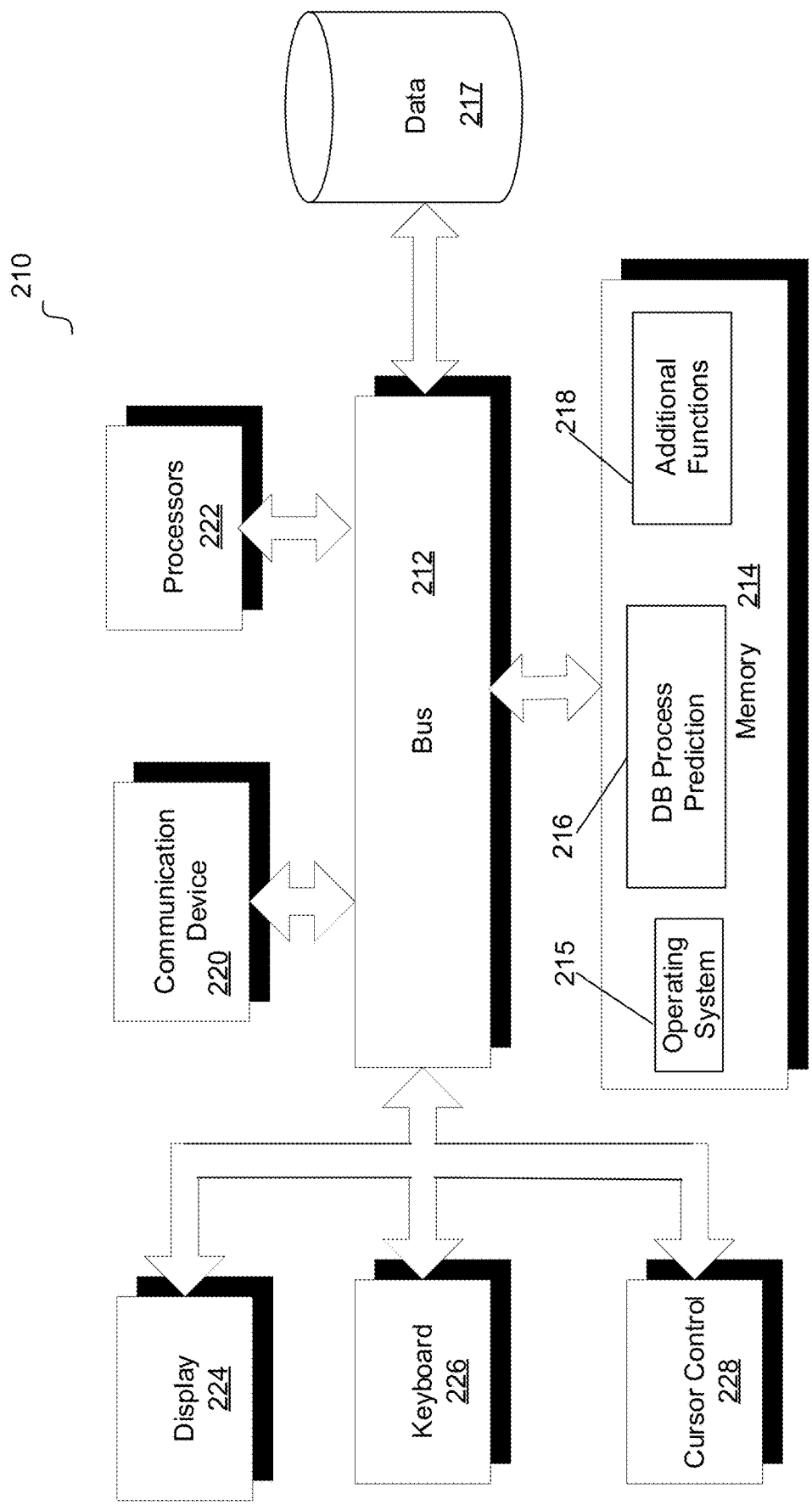
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, database process prediction component 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, database process prediction component 216, as well as other applications modules 218. Operating system 215 provides operating system functionality for system 210. Database process prediction component 216 may provide system functionality for predicting an execution time for a database process, or may further provide any other functionality of this disclosure. In some instances, database process prediction component 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of the Oracle® Enterprise Resource Planning ("ERP") Cloud, and/or engagement engine ("EE") embedded in Oracle® Cloud, such as Oracle® Business Intelligence Enterprise Edition ("OBIEE"), Oracle® data Integrator, for example. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Figure 3:
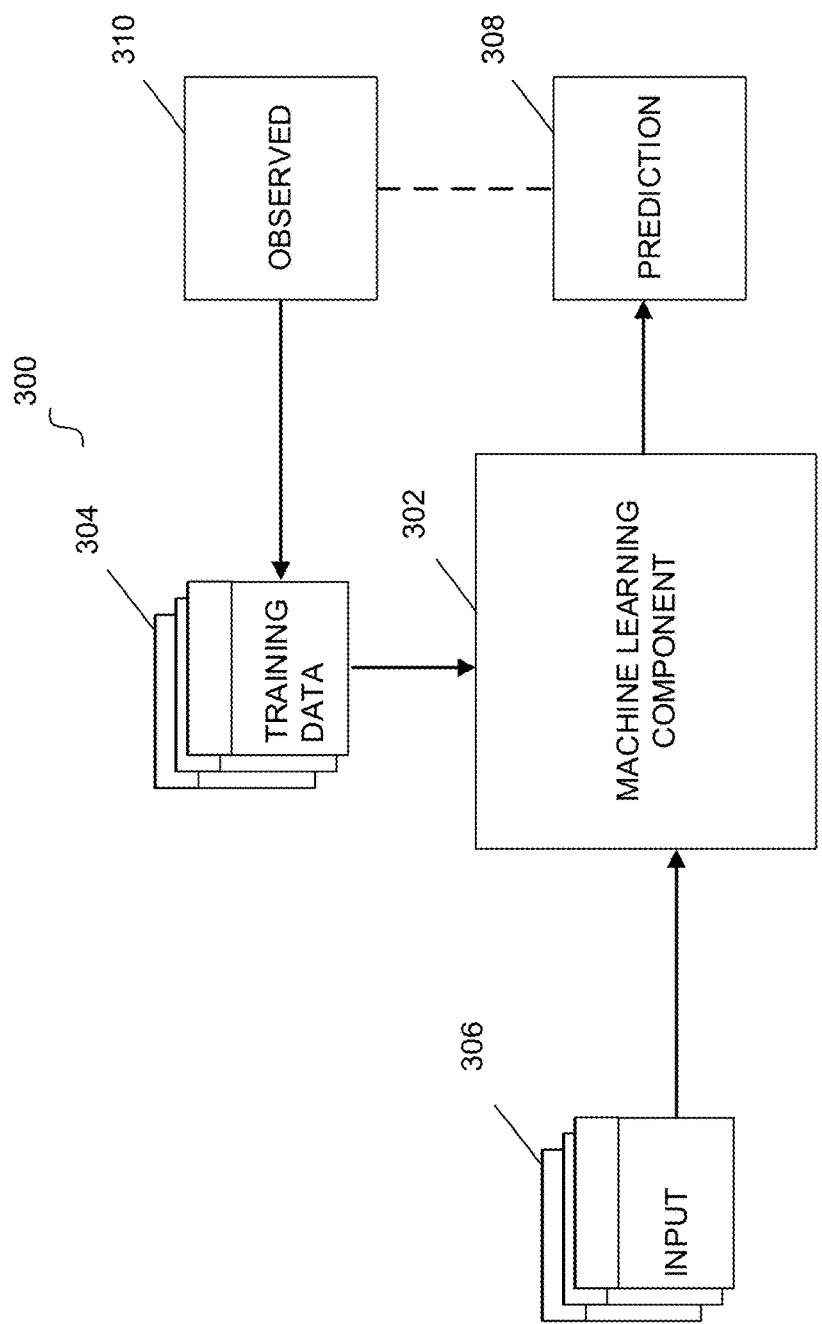
FIG. 3 illustrates a prediction system according to an example embodiment.

FIG. 3 illustrates a prediction system according to an example embodiment. System 300 includes machine learning component 302, training data 304, input data 306, predictions 308, and observed data 310. In some embodiments, machine learning component 302 can be a designed model that includes one or more machine learning elements (e.g., a neural network, support vector machine, Bayesian network, and the like). Training data 304 can be any set of data capable of training machine learning component 302 (e.g., a set of features with corresponding labels, such as labeled data for supervised learning). In some embodiments, training data 304 can be used to train machine learning component 302 to generate a trained machine learning model.

In some embodiments, input data 306 (e.g., an input set of features) can be input to the trained machine learning model to generate predictions 308. In some implementations, predictions 308 can represent observable data points. Accordingly, at a point in time, a given prediction within predictions 308 can include an observed data point that corresponds to the given prediction. In other words, a given observed data point within observed data 310 can correspond to the data that was attempted to be predicted by a given prediction within predictions 308.

For example, a trained machine learning model may be configured to predict a duration of execution time for a database process. Accordingly, a prediction generated by this trained model can be a duration of execution time prediction. Upon executing the database process, the actual duration of execution time can be observed (e.g., retrieved and stored). The predicted duration of execution time can be compared to the observed duration of execution time to arrive at an accuracy calculation. In some embodiments, the observed duration of execution time can be added to training data 304, and machine learning component 302 can be trained using updated training data 304 (e.g., retrained or trained from initialization).

The design of machine learning component 302 can include any suitable machine learning model components (e.g., a neural network, support vector machine, specialized regression model, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. In some embodiments, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some embodiments, a k-nearest neighbor ("KNN") algorithm can be implemented. For example, a KNN algorithm can determine a distance between a candidate database process (e.g., represented by input 306) and the instances of training data 304, and one or more "nearest neighbors" relative to this distance can be determined (the number of neighbors is based on a value selected for K). Prediction 308 can then be generated based on the duration of execution times monitored for these "nearest neighbor" instances, such as based on an average of these values.

In some embodiments, machine learning component 302 can be multiple models stacked, for example with the output of a first model feeding into the input of a second model. Some implementations can include a number of layers of prediction models. In some embodiments, features of machine learning component 302 can also be determined. For example, feature engineering can be used to generate a set of features implemented by one or more machine learning models.

In some embodiments, the design of machine learning component 302 can be tuned during training, retraining, and/or updated training. For example, tuning can include adjusting a number of hidden layers in a neural network, adjusting a kernel calculation used to implement a support vector machine, and the like. This tuning can also include adjusting/selecting features used by the machine learning model. Embodiments include implementing various tuning configurations (e.g., different versions of the machine learning model and features) while training in order to arrive at a configuration for machine learning component 302 that, when trained, achieves desired performance (e.g., performs predictions at a desired level of accuracy, run according to desired resource utilization/time metrics, and the like).

In some embodiments, retraining and updating the training of the machine learning model can include training the model with updated training data. For example, the training data can be updated to incorporate observed data, or data that has otherwise been labeled (e.g., for use with supervised learning).

In some embodiments, machine learning component 302 can include an unsupervised learning component. For example, one or more clustering algorithms, such as hierarchical clustering, k-means clustering, and the like, or unsupervised neural networks, such as an unsupervised autoencoder, can be implemented. In this example, the machine learning data generated by monitoring/logging database processes can be input to the unsupervised learning component to learn aspects of the data, such as clusters that relate features to duration of execution time. Based on the learned relationships, predictions 308 that represent a predicted duration of execution time for a candidate database process can be generated (e.g., based on input 306 that includes features representative of the candidate database process).

In some embodiments, training data 304 can be generated by monitoring the execution of database processes. Referring back to FIG. 1, monitor batch process 106 can monitor database process execution and log corresponding database process execution data. This data can be used to generate training data 304. In this example, machine learning component 302 can be trained to predict a duration of execution time for a candidate database process (e.g., represented by features of input 306).

Embodiments enable comparing SQL query run times over a period of time and provide this information in an actionable form for application level users. For example, this data can assist in analyzing, troubleshooting, and addressing performance bottlenecks. In some embodiments, data sampled over a period of time can also be used to predict SQL query run times for a candidate database process. For example, this prediction can be local to the environment on which it is carried out and will be different from benchmark numbers released by vendors.

Embodiments not only help troubleshoot performance issues by analyzing past data but also achieve the proactive identification of potential SQL bottlenecks. For example, this data when sampled over time can be used to extrapolate/predict database process run times for month/quarter/year end activities. In some embodiments, this tool will enable proactive SQL monitoring for core SQL queries (e.g., in an enterprise resource planning ("ERP") tool) in a manner that is conducive to business users. Embodiments of the tool implement granular level data logging when triggered. In some embodiments, this logging does not impact (or does not significantly impact) database process run times. This data can provide valuable insights into how well or poorly (e.g., using a relative metric) database processes (or portions of database processes, such as individual SQLs) have been performing.

At times, vendors (e.g., hardware, software as a service, or other service providers) provide benchmarks for core processes (e.g., in an ERP), however, more often than not, these relate to specific hardware. With the popularity of cloud services, both compute and storage have become more elastic. Embodiments not only help customers proactively identify issues, but when deployed in the cloud can help identify potential areas of improvements for individual SQL queries. This will also help quantify performance gains (e.g., by upgrading hardware as the SQL run times are bound to change).

Figure 4:
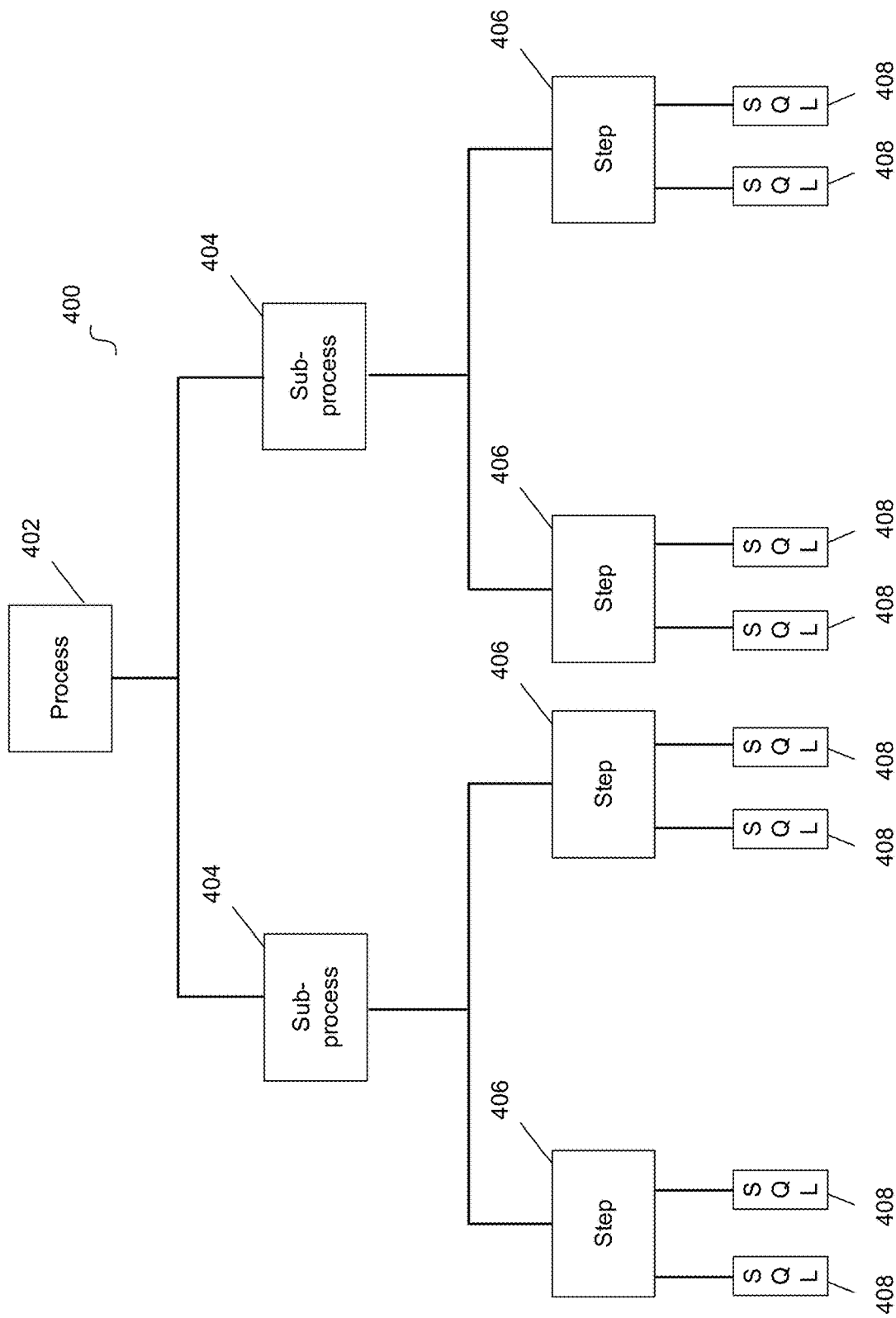
FIG. 4 illustrates a sample database process according to an example embodiment.

Referring back to FIG. 1, database process 104 can be a multi-level batch program or process for execution by database 102. FIG. 4 illustrates a sample database process according to an example embodiment. Process 400 includes sub-processes 404, sub-processes 404 include steps 406, and steps 406 include SQL statements 408. In some embodiments, process 402 represents a batch program or process that includes database commands, and sub-processes 404 represent sub-sections of the overall process. In this example, steps 406 represents sub-parts of the sub-processes 404, and SQL statements 408 represent that individual SQL statements that are within the steps 406. Batch programs or processes can be complex routines or sub-routines that change or query a database in a number of different ways, and as such the complexity is at times mitigated through the use of an organization scheme similar to the one illustrated in FIG. 4.

Embodiments target portions of a complex batch program or process, such as process 402, by targeting sub-processes 404, steps 406, or SQL statements 408 for monitoring. For example, different aspects of a batch program or process can use different amounts of computing resources and/or execute at different time rates. As a result, targeting individual parts of a process, such as individual SQL statements, can efficiently use resources yet still achieve high accuracy in monitoring the process overall. For example, one or more SQL statements may represent the bulk of execution time for a batch program or process, and thus monitoring these few SQL statements can best utilize resources while still maintaining accuracy for database process monitoring.

Referring back to FIG. 1, monitor batch process 106 can monitor database process execution and log the monitored information. For example, the below table represents data that can be logged about a database process:

| Prcss instnce % prcss instnee | Prcss % batch press | Section % sec | Step % step | DML/ DDL Code | Iter. 1, 2, n | Rows Impctd % rows | Start % date time | End % date time | ID ID for SQL |
|---|---|---|---|---|---|---|---|---|---|
| PRCS-INSTANCE | Instances of a process that can be run with a unique identifier. This can enable data selection to be independent for each run without overlapping. In some embodiments, this can be considered a soft locking mechanism for the DB. | | | | | | | | |
| Program | Batch Program Name | | | | | | | | |
| Section | Batch Program can contain complex logic divided within Section(s). One program may have multiple sections. | | | | | | | | |
| Step | Further drill down within the Batch Program. One can setup many Steps within a Section | | | | | | | | |
| Action | Lowest level executable code (SQL). This can either be a DML/DDL/DCL etc. | | | | | | | | |
| Iteration | How many times that Action ran for a given run (e.g., unique PRCSINSTANCE) | | | | | | | | |
| Rows Impacted | How many rows did that SQL impact within the Database? | | | | | | | | |
| Start/ | SQL Start and End Times, and in some | | | | | | | | |
| End Time | embodiments Start and End Dates | | | | | | | | |
| ID (e.g., SQL ID) | This can be a hash generated by the database, such as a hash for parsed SQL. This can link the currently logged SQL with various database features, such as reporting features. | | | | | | | | |

In some embodiments, a table with data represented in the above tables can be generated, such as within database 102 of FIG. 1. Inserts into this table (e.g., logging the monitored database processes) can be executed via secondary database connection to avoid performance impacts on the primary database connection. For example, utilizing a secondary database connection can help isolate program logic commit settings. Referring back to FIG. 1, monitor batch process 106 can be software that implements the logging functionality (e.g., inserts into the generated logging table via a secondary database connection).

In some embodiments that utilize a secondary database connection, even if the batch process or program fails (e.g., batch process 104 of FIG. 1 that uses a primary database connection), the logging table table will still hold data for SQLs which have successfully run prior to the failure. In some embodiments, a batch process or program can contain multiple Sections/Steps based on complexity, as illustrated in FIG. 4. Embodiments permit user selection of specific portions of a batch process or program (e.g., individual SQLs) from a given program for monitoring/logging. In some embodiments, for each run of a batch program (e.g., execution within database 102 of FIG. 1), monitoring/logging for one or more SQLs (e.g., selected for monitoring/logging) can be performed. For example, every time a selected SQL is executed, the rows impacted and execution duration (in seconds) can be stored. Unlike how conventional database tracing works (which traces the entire program), this granular level control allows users to select the SQLs that they would like to track. In production instances where tracing is discouraged, this functionality is particularly beneficial.

FIG. 5 illustrates a sample data visualization according to an example embodiment. Visualization 502 visually depicts different execution times for the same SQL across different runs or executions of database processes. The x-axis represents the different runs or executions, while the y-axis represents both rows impacted and duration of execution time. In some embodiments, these visualizations can indicate a status of the database at the time of execution for the various runs. For example, a sudden dip or spike can be inferred as an anomaly. A dip in time taken for a similar set of rows (e.g., instances of logged/monitored data) may indicate that elastic hardware is hosted in a cloud. A spike could indicate stale object statistics. Based on these indications a pattern of specialized actions may be taken to mitigate any performance issues.

Figure 6A:
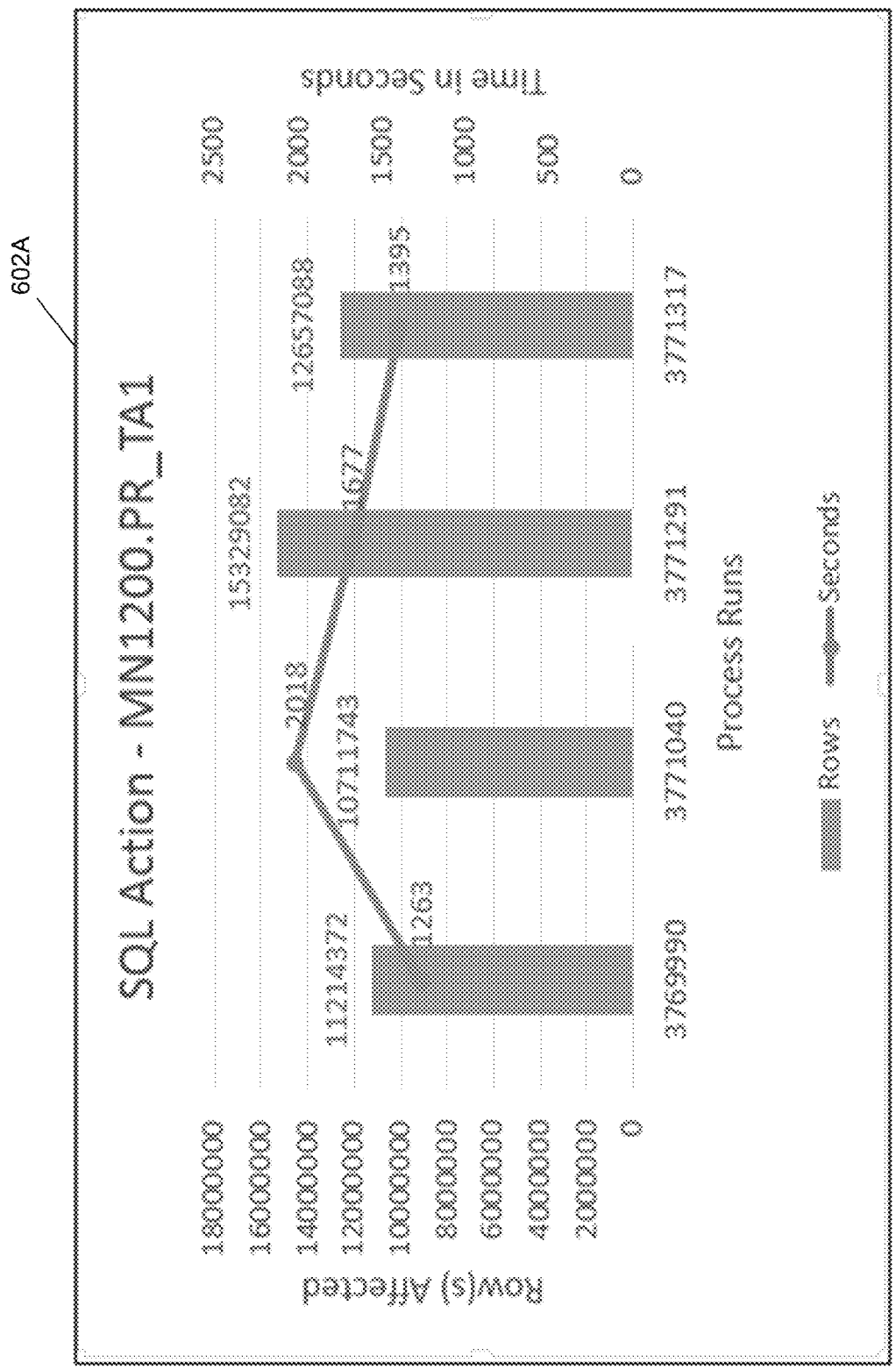
FIGS. 6A-6B illustrate sample data visualizations according to an example embodiment.
Figure 6B:
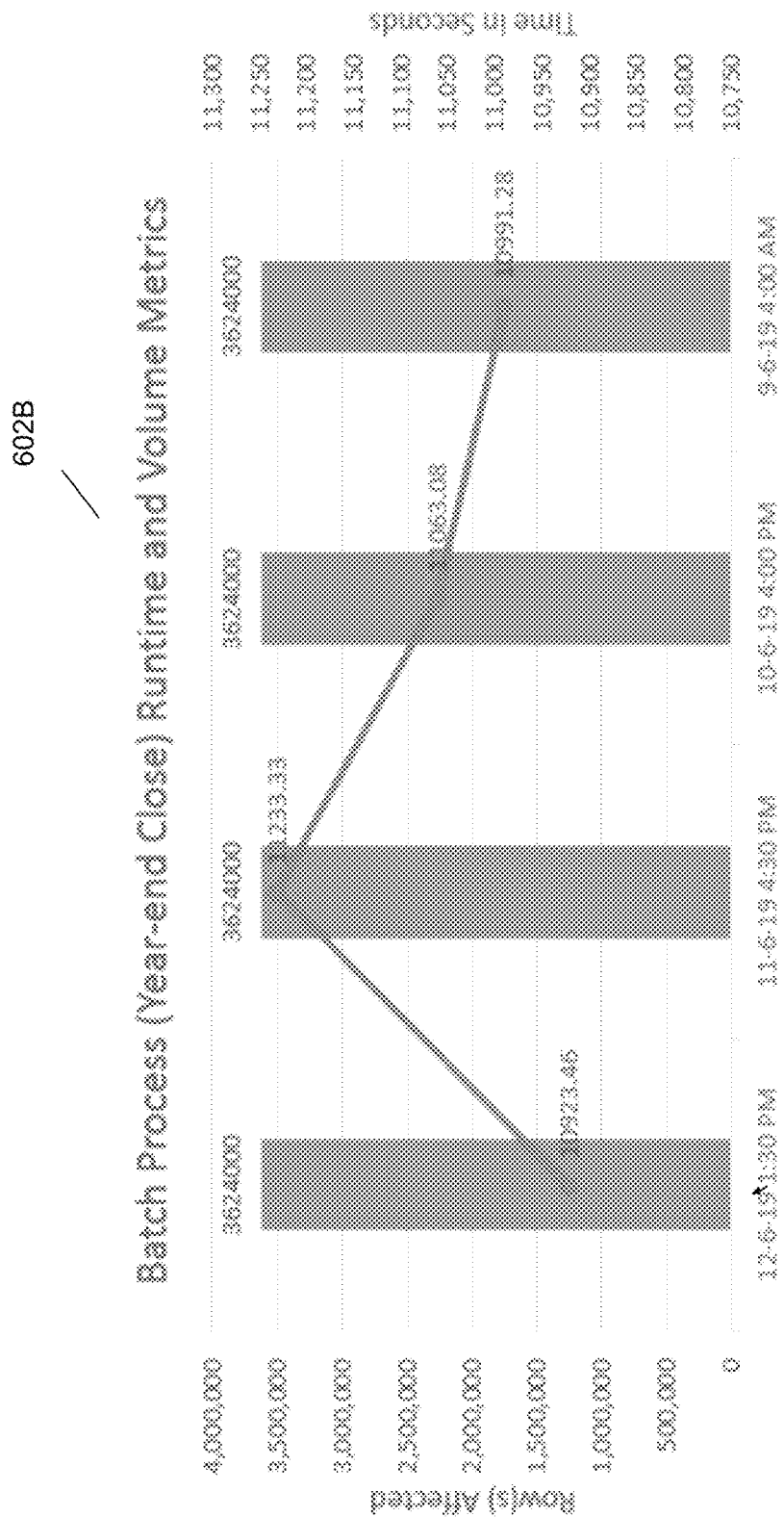

In some embodiments, the logged data (e.g., based on the monitoring of executed batch programs or processes, such as one or more selected individual SQLs) can be used to generate machine learning data. For example, machine learning dataset 108 of FIG. 1 can be generated based on the monitoring/logging. FIG. 6 illustrates example machine learning data generated by database process monitoring according to an example embodiment. Machine learning data 600 includes features 602, labels 604, and predictions 606. In some embodiments, features 602 can include an ID for the monitored database process or portion of the database process (e.g., section, step, or individual SQL) and a number of rows impacted by the corresponding ID. In some embodiments, features 602 also include an execution start time and/or an execution end time for the corresponding ID. Labels 604 can include a duration of execution time for the corresponding ID. In some embodiments, the execution start times and end times can include a date component. For example, the date component can indicate a day of week, day of month, day of quarter, day of year, and the like.

In some embodiments, machine learning data 600 can be used to train a supervised learning component (e.g., machine learning component 302 of FIG. 3). For example, labels 604 can train the supervised machine learning component to recognize trends in features 602 (e.g., ID, number of rows impacted, start time, and/or end time). In some embodiments, machine learning component 302 can be a neural network trained by machine learning data 600. In this example, machine learning component 302 can be trained to predict a duration of execution time for a candidate database process given the features within machine learning data 600. In some embodiments, machine learning component 302 can include a KNN model that leverages machine learning data 600. In this example, machine learning component 302 can be trained to identify nearest neighbors (e.g., based on a distance metric) for a candidate database process from within machine learning data 600, and based on these neighbors and their respective duration of execution times, can predict a duration of execution time for the candidate database process.

In embodiments where the start time and end time include a date component, the supervised machine learning model trained using machine learning data 600 can recognize trends within the date component of features 602. These trends can include how a day of week, day of month, day of quarter, and/or day of year impact the duration of execution time for database processes. For example, weekly, monthly, or quarterly batch processes can impact resource utilization and ultimately change the duration of execution time for a database, such as within a cloud-based implementation that includes elastic resources. Accordingly, embodiments that utilize a date component within features 602 can more accurately predict a duration of execution time for a candidate database process at least because these embodiments consider a date component when predicting.

In some embodiments, prediction 606 can be a predicted duration of execution time for a candidate database process, such as a database process (or a section, step, or one or more individual SQLs of a database process) that has yet to be executed by a database (e.g., database 102 of FIG. 1). Referring back to FIG. 3, input 306 can be representative of the features of the candidate database process, where these features can be similar to the features of the machine learning data 600 (e.g., training data 304 of FIG. 3). Based on input 306, machine learning component 302 can generate predictions 308 (or prediction 606 of FIG. 6), or the predicted duration of execution time for the candidate database process.

Figure 7:
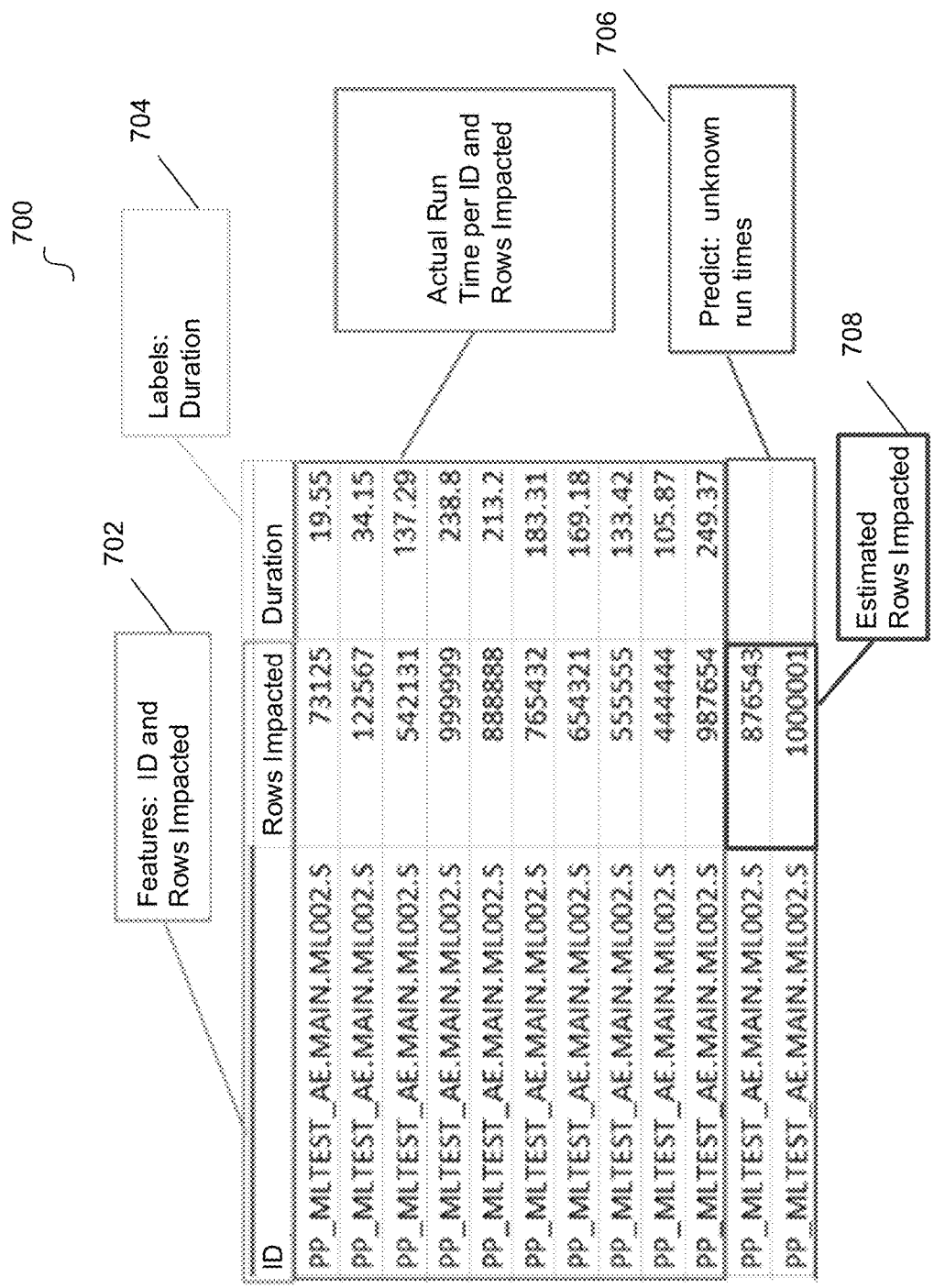
FIG. 7 illustrates example machine learning data generated by database process monitoring according to an example embodiment.

FIG. 7 illustrates an example functionality for monitoring database processes to generate machine learning data according to an example embodiment. In one embodiment, the functionality of FIG. 7 (and FIG. 8 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 702, selections of database processes or portions of database processes can be received. For example, a user can select a database process (e.g., batch process or program), one or more sub-processes of the database process, one or more steps of the database process, and/or one or more individual SQL statements of the database process, where the selected process or portions are flagged for monitoring/logging. In some embodiments, a plurality of selections for a plurality of database processes and/or portions of database processes are received.

At 704, a database process can be executed. For example, a batch process or program can be executed by a database, where the batch process or program can include a plurality of SQL statements that are executed. In some embodiments, a plurality of database processes can be executed by the database. The database processes can be executed using a first database connection.

At 706, the selected portions of the database process can be monitored. For example, information about the execution of the selected portions of the database process can be logged, such as in a database table. This logged information can include one or more of a database process instance, a batch process or program name, a sub-process, a step, the executed SQL (e.g., DML, DDL, DCL, and the like), an iteration number, a start time, an end time, a number of rows impacted, and an identifier for the parsed SQL. In some embodiments, the logged information can be inserted into a database table using a second database connection that is different from the first database connected used to execute the database process.

In some embodiments, a plurality of database processes executed on database implementations can be monitored, where the monitoring includes determining a start time, an end time, and a number of rows impacted by portions of the database processes. Similar logged information can be stored in a database table for the plurality of monitored database processes. For example, at least one of the monitored database processes can include a plurality of SQL statements, a subset of the plurality of SQL statements can be flagged/selected for monitoring, and start times, end times, and numbers of rows impacted can be logged for the subset of the plurality of SQL statements flagged/selected for monitoring.

At 708, machine learning data can be generated based on the monitoring and/or logging. For example, the logged information for a plurality of database processes or portions of database processes selected for monitoring can be aggregated to generate machine learning data. In some embodiments, the monitored database processes portions of database processes generate instances of machine learning data comprising at least the number of rows impacted and an associated duration of execution time.

In some embodiments, the generated machine learning data includes a set of SQL statements, a duration of time for each SQL statement in the set, and a number of database rows impacted for each SQL statement in the set. In some embodiments, the generated instances of machine learning data include a number of rows impacted and an associated duration of time for executed SQL statements flagged/selected for monitoring.

Figure 8:
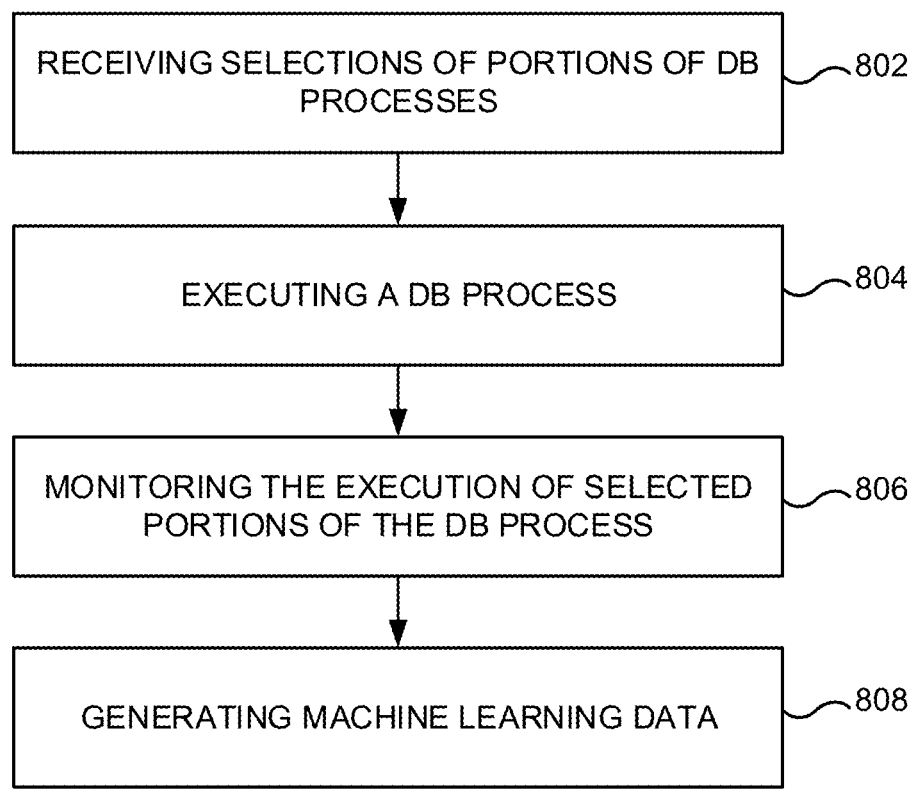
FIG. 8 illustrates an example method for monitoring database processes to generate machine learning predictions according to an example embodiment.
Figure 9:
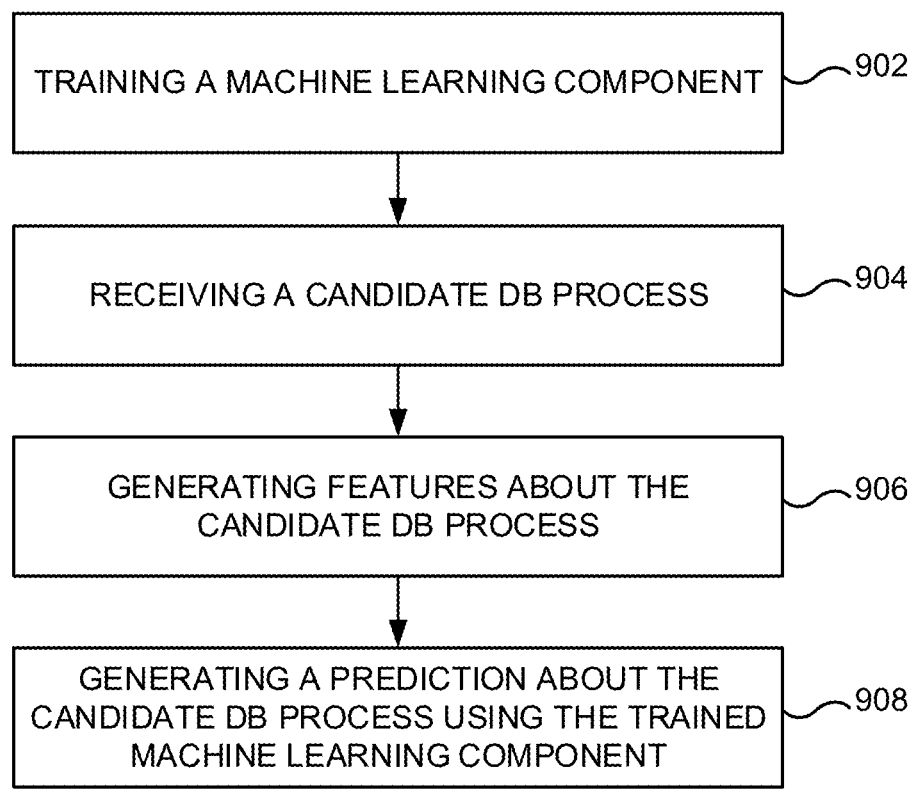
FIG. 9 illustrates an example method for generating candidate data process predictions according to an example embodiment.

FIG. 8 illustrates an example functionality for generating candidate data process predictions according to an example embodiment. At 802, a machine learning component can be trained. For example, machine learning data can be generated by monitoring/logging the execution of database processes, such as using the functionality of FIG. 7. In some embodiments, the machine learning data generated can be training data for a machine learning component. For example, the generated machine learning data can include one or more features (e.g., identifiers, start time, end time, number of rows impacted, and the like) and labels (e.g., duration of execution time). The machine learning data can thus be used to train a machine learning component, such as a supervised machine learning component.

At 804, a candidate database process can be received. For example, a candidate database process with a number of SQL statements can be received. In some embodiments, the candidate database process can be a batch process or program with a number of sub-processes, steps, and SQL statements.

At 806, features for the candidate database process can be generated. For example, the features can be similar to the features for the machine learning data generated by the functionality of FIG. 7. At 808, a duration of time for the candidate database process can be predicted using a machine learning component and the machine learning data, where the candidate database process is to be executed on a database implementation. For example, a machine learning component can be trained using the machine learning data (e.g., training data), and the trained machine learning component can be configured to receive the features of the candidate database process as input and generate of a duration of execution time prediction for the candidate database process. In some embodiments, the machine learning component is configured to predict the duration of time for the candidate database process independent of hardware used to execute the candidate database process.

In some embodiments, the machine learning component can include an unsupervised machine learning component. For example, the unsupervised machine learning component can receive the generated machine learning data as input and determine trends in the data, such as clusters within the data. In some embodiments, these determined trends (e.g., clusters) can be used to generate a duration of execution time data prediction for the candidate database process.

Embodiments monitor database processes to generate machine learning predictions. For example, database processes can include batch processes or programs that perform operations on a database, such as writes, reads, and/or queries. In some embodiments, database processes can include a number of SQL statements executed on a database. Embodiments monitor database processes to generate machine learning data that enables machine learning predictions for candidate database processes.

In some embodiments, a database process can include database sub-processes, which can include database steps, which can include a number of SQL statements. Embodiments can monitor database execution at the process level, sub-process level, step level, and/or SQL statement level. For example, for a given SQL statement executed as part of a database process (e.g., batch process or program), a start time, end time, number of rows impacted in the database, and duration of execution time can be logged for the given SQL statement. Embodiments can monitor at the SQL statement level, and thus individual SQL statements within a larger database process can be monitored without monitoring the database process as a whole. In other words, the monitoring can be targeted, and therefore can use resource more efficiently and minimize any disruptions to business (or other) functions.

In some embodiments, based on the monitoring, execution times and a number of rows impacted can be logged for an element of a database process (e.g., at the process level, sub-process level, step level, or SQL statement level). These logged values can be used to generate machine learning data. For example, training data for a supervised machine learning component can be generated, where the number of rows impacted can be a feature of the training data (in addition to other features) and the monitored duration of execution time can be the labels for the training data. In some embodiments, a supervised machine learning component can then be trained with the training data and used to generate a duration of execution time prediction for a candidate database process. In some embodiments, the generated machine learning data can be used by an unsupervised machine learning component. For example, an unsupervised machine learning component can match a candidate database process to one or more instances of the generated machine learning data, which can in turn generate a duration of execution time prediction for a candidate database process.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for monitoring database processes to generate machine learning predictions, the method comprising:

receiving a selection of structured query language (SQL) statements for monitoring;

monitoring a plurality of database processes executed on database implementations, the monitored database processes comprising at least one of the selection of SQL statements, wherein the monitoring comprises determining a start time, an end time, and a number of rows impacted by the selection of SQL statements, and the monitored database processes generate instances of machine learning data comprising at least the number of rows impacted and an associated duration of time; and predicting, using a machine learning component and the machine learning data, a duration of time for a candidate database process for execution on a database implementation, wherein the machine learning component matches the candidate database process to one or more instances of the machine learning data generated by the monitoring to predict the duration of time for the candidate database process.

2. The method of claim 1, wherein one or more of the monitored database processes comprise a plurality of database sub-processes and at least a portion of the database sub-processes comprise the selection of SQL statements, and the monitoring comprises logging an end time and a number of rows impacted upon executing the portion of database sub-processes.

3. The method of claim 1, wherein one or more of the monitored database processes comprise a plurality of database steps and at least a portion of the database steps comprise the selection of SQL statements, and the monitoring comprises logging an end time and a number of rows impacted upon executing the portion of database steps of.

4. The method of claim 1, wherein the generated machine learning data comprises a set of SQL statements, a duration of time for each SQL statement in the set, and a number of database rows impacted for each SQL statement in the set.

5. The method of claim 4, wherein the candidate database process comprises a plurality of SQL statements.

6. The method of claim 5, wherein the machine learning component is trained using the machine learning data generated by the monitoring, and the trained machine learning component is used to predict the duration of time for the candidate database process.

7. The method of claim 5, wherein the machine learning component comprises an unsupervised machine learning component, and the unsupervised machine learning component matches the candidate database process to one or more instances of the machine learning data generated by the monitoring to predict the duration of time for the candidate database process.

8. The method of claim 4, wherein, for at least a subset of the executed database processes, the execution of the subset of database processes is performed using a first database connection, and the monitoring of the subset database processes, logging, and generation of the machine learning data is performed using a second database connection that is different from the first database connection.

9. The method of claim 8, wherein the logging of start times, end times, and numbers of rows impacted is achieved by writing data to a log database table using the second database connection.

10. The method of claim 1, wherein the generated instances of machine learning data comprise a number of rows impacted and an associated duration of time for the selection of SQL statements.

11. The method of claim 1, wherein the machine learning component is configured to predict the duration of time for the candidate database process independent of hardware used to execute the candidate database process.

12. A system for monitoring database processes to generate machine learning predictions, the system comprising:
a processor in communication with a storage device, wherein the processor is configured to:
receive a selection of structured query language (SQL) statements for monitoring;
monitor a plurality of database processes executed on database implementations, the monitored database processes comprising at least one of the selection of SQL statements, wherein the monitoring comprises determining a start time, an end time, and a number of rows impacted by the selection of SQL statements, and the monitored database processes generate instances of machine learning data comprising at least the number of rows impacted and an associated duration of time; and
predict, using a machine learning component and the machine learning data, a duration of time for a candidate database process for execution on a database implementation, wherein the machine learning component matches the candidate database process to one or more instances of the machine learning data generated by the monitoring to predict the duration of time for the candidate database process.

13. The system of claim 12, wherein one or more of the monitored database processes comprise a plurality of database sub-processes and at least a portion of the database sub-processes comprise the selection of SQL statements, and the monitoring comprises logging an end time and a number of rows impacted upon executing the portion of the database sub-processes.

14. The system of claim 12, wherein one or more of the monitored database processes comprise a plurality of database steps and at least a portion of the database steps comprise the selection of SQL statements, and the monitoring comprises logging an end time and a number of rows impacted upon executing the portion of the database steps.

15. The system of claim 12, wherein the generated instances of machine learning data comprise a number of rows impacted and an associated duration of time for the selection of SQL statements.

16. The system of claim 15, wherein, for at least a subset of the executed database processes, the execution of the subset of database processes is performed using a first database connection, and the monitoring of the subset database processes, logging, and generation of the machine learning data is performed using a second database connection that is different from the first database connection.

17. A non-transitory computer readable medium having instructions stored thereon that, when executed by a processor, cause the processor to monitor database processes to generate machine learning predictions, wherein, when executed, the instructions cause the processor to:
receive a selection of structured query language (SQL) statements for monitoring;
monitor a plurality of database processes executed on database implementations, the monitored database processes comprising at least one of the selection of SQL statements, wherein the monitoring comprises determining a start time, an end time, and a number of rows impacted by the selection of SQL statements, and the monitored database processes generate instances of machine learning data comprising at least the number of rows impacted and an associated duration of time; and
predict, using a machine learning component and the machine learning data, a duration of time for a candidate database process for execution on a database implementation, wherein the machine learning component matches the candidate database process to one or more instances of the machine learning data generated by the monitoring to predict the duration of time for the candidate database process.

18. The system of claim 16, wherein the logging of start times, end times, and numbers of rows impacted is achieved by writing data to a log database table using the second database connection.

19. The method of claim 1, wherein the monitoring further comprises determining an execution date for the selection of SQL statements, and the generated instances of the machine learning data further comprise the execution date.

20. The method of claim 19, wherein the prediction is based on an execution date for the candidate database process.

\* \* \* \* \*

UNITED STATES PATENT AND TRADEMARK OFFICE
CERTIFICATE OF CORRECTION

PATENT NO. : 11,537,909 B2
APPLICATION NO. : 16/729840
DATED : December 27, 2022
INVENTOR(S) : Arthanat et al.

It is certified that error appears in the above-identified patent and that said Letters Patent is hereby corrected as shown below:

On the Title Page

On page 2, Column 2, under Other Publications, Line 5, delete "Worklads" and insert -- Workloads --, therefor.

On page 2, Column 2, under Other Publications, Line 12, delete "??" and insert -- ? --, therefor.

In the Specification

In Column 7, Line 48, delete "Prcss Prcss" and insert -- Process Process --, therefor.

In Column 7, Line 49, delete "instnce" and insert -- Instance --, therefor.

In Column 7, Line 49, delete "Impctd" and insert -- Impacted --, therefor.

In Column 7, Line 50, delete "prcss" and insert -- process --, therefor.

In Column 7, Line 51, delete "instnee press" and insert -- Instance Process --, therefor.

In Column 8, Line 3, delete "Prcss Prcss" and insert -- Process Process --, therefor.

In Column 8, Line 4, delete "instnce" and insert -- Instance --, therefor.

In Column 8, Line 4, delete "Impctd" and insert -- Impacted --, therefor.

In Column 8, Line 5, delete "prcss" and insert -- process --, therefor.

In Column 8, Line 6, delete "instnee press" and insert -- Instance Process --, therefor.

In Column 8, Line 27, delete "table table" and insert -- table --, therefor.

Signed and Sealed this
Seventeenth Day of October, 2023

Katherine Kelly Vidal
*Director of the United States Patent and Trademark Office*